United States Patent [19]
Darcie et al.

[11] Patent Number: 5,373,385
[45] Date of Patent: Dec. 13, 1994

[54] METHOD AND APPARATUS FOR REDUCTION OF OPTICAL COMMUNICATION SYSTEM IMPAIRMENTS

[75] Inventors: Thomas E. Darcie, Middletown; Sheryl L. Woodward, Lincroft, both of N.J.

[73] Assignee: AT&T Corp., Murray Hill, N.J.

[21] Appl. No.: 151,600

[22] Filed: Nov. 12, 1993

[51] Int. Cl.$^5$ .............................................. H04B 10/00
[52] U.S. Cl. .................................. 359/162; 319/125; 319/132; 319/182; 319/183
[58] Field of Search ............... 359/125, 111, 132, 157, 359/161, 162, 173, 180–183; 372/26, 28, 20, 96, 38; 455/6.1

[56] References Cited

U.S. PATENT DOCUMENTS

4,357,713  11/1982  Blackbthrn et al. ................. 356/180

FOREIGN PATENT DOCUMENTS

0565035  10/1993  European Pat. Off. ............ 359/183

OTHER PUBLICATIONS

Cebulla, U., Bouayad, J., Haisch, H., Klenk, M., Laube, G., Mayer, H. P., Weinmann, R. and Zielinski, E., "1.55 μm Strained Layer Multiple Quantum Well DFB-Lasers With Low Chirp and Low Distortions For Optical Analog CATV Distribution Systems", CLEO '93 Wednesday Morning, CWA2, p. 226.

Darcie, Thomas E., Bodeep, George E., and Saleh, Adel A. M., "Fiber-Reflection-Induced Impairments in Lightwave AM-VSB CATV Systems," Journal of the Lightwave Technology, vol. 9, No. 8, Aug. 1991, pp. 991–995.

Judy, A. F. "Intensity Noise From Fiber Rayleigh Backscatter and Mechanical Splices," Proceedings of the 15th European Conference of Optical Communications, Gothenburg, Sweden, Sep. 10, 1989.

Mao, X. P., Bodeep, G. E., Tkach, R. W., Chraplyvy, A. R., Darcie, T. E., and Derosier, R. M., "Suppression of Brillouin Scattering in Lightwave AM-VSB CATV Transmission Systems," OFC/IOOC '93 Technical Digest, vol. 4, Conference Edition, Feb. 21-26, 1993, pp. 141-143.

Phillips, M. R., Darcie, T. E., Marcuse, D., Bodeep, G. E., and Frigo, N. J., "Nonlinear Distortion Generated by Dispersive Transmission of Chirped Intensity–Modulated Signals," IEEE Photonics Technology Letters, vol. 3, No. 5, May 1991, pp. 481–483.

Sakano, Shinji; Tsuchiya, Tomonobu; Suzuki, Makoto; Kitajima, Shigeki; and Chinone, Naoki, "Tunable DFB Laser with a Striped Thin-Film Heater," IEEE Photonics Technology Letters, vol. 4, No. 4, Apr., 1992, pp. 321–323.

Woodward, S. L., Koren, U., Miller, B. I., Young, M. G., Newkirk, M. A., and Burrus, C. A., "A DBR Laser Tunable by Resistive Heating," IEEE Photonics Technology Letters, vol. 4, No. 12, Dec. 1992, pp. 1330–1332.

Yariv, Amnon; Blauvelt, Hank; and Wu, Shu-Wu, "A Reduction of Interferometric Phase-to-Intensity Conversion Noise in Fiber Links by Large Index Phase Modulation of the Optical Beam," Journal of Lightwave Technology, vol. 10, No. 7, Jul. 1992, pp. 978–981.

Primary Examiner—Richard E. Chilcot, Jr.
Assistant Examiner—Kinfe-Michael Negash

[57] ABSTRACT

A method and apparatus for reducing noise in optical communication systems is effected by modulating or dithering the laser output frequency at a relatively low rate. The laser may be dithered by applying a low frequency sine wave either to the resistive heater in the phase control section or to the laser's active section directly. By dithering the laser at a low frequency and at a sufficiently high amplitude to cause large optical frequency excursions, the noise caused by multipath interference will decrease without substantially increasing negative dispersion effects.

23 Claims, 3 Drawing Sheets

METHOD AND APPARATUS FOR REDUCTION OF OPTICAL COMMUNICATION SYSTEM IMPAIRMENTS

FIELD OF THE INVENTION

The present invention relates generally to the field of optical communications systems, and particularly to methods and apparatus for reduction of system impairments including interference noise and stimulated Brillouin scattering in lightwave transmission systems, such as those utilized for transmitting cable television signals.

BACKGROUND OF THE INVENTION

Community antenna television (CATV) signals used for cable television transmission may be transmitted over optical communication networks, using intensity-modulated analog lightwave signals. Lasers are typically employed to generate the light signals. A CATV signal generally consists of several carrier signals representing different television channels. The analog lightwave systems used for transmitting these CATV signals have stringent carrier-to-noise ratio (CNR) and distortion requirements.

A source of noise referred to as interferometric intensity noise (IIN) can degrade the CNR, thereby compromising system performance. IIN is caused predominantly by multipath interference (MPI), which is interference that results from multiple reflections of the lightwave signal in optical fiber.

In particular, MPI is detrimental to analog lightwave systems because it converts source phase noise to lightwave intensity noise, which increases the system noise level. For a further discussion of MPI, see Judy, "Intensity Noise from Fiber Rayleigh Backscatter and Mechanical Splices," Proc. 15th European Conf. Optical Communications (Gothenburg, Sweden, Sep. 10, 1989). The spectrum of the noise caused by IIN is strongly dependent on the optical spectrum of the modulated laser. Lasers exhibiting relatively broad linewidths produce phase noise that falls within the CATV signal band. Consequently, IIN in systems employing such lasers can degrade signal quality.

Interference noise may also be caused by single reflections of bidirectional light transmission, referred to herein as single reflection noise, which may occur in interactive CATV applications. In bidirectional systems, light travels in both directions along the optical fiber. If light originating at one end of the system is reflected, then the reflected light may interfere with the light originating from the other end of the system. Because of this interference, the optical frequency differences between the light from the two sources are converted to intensity noise. When the light sources' optical frequencies are close this noise may fall within the frequency band of interest, thereby degrading system performance.

MPI noise and single reflection noise within the CATV band may be reduced by distributing the total noise spectrum over a broader frequency range. It is known that by increasing the spectral width of the laser used to transmit the optical signals, the noise concentration due to IIN may be spread over a wide range of frequencies. See Judy, supra. Consequently, broadening the optical spectrum of the transmitting laser reduces the concentration of IIN at the frequencies within the CATV signal band.

In the past, transmission systems using direct intensity-modulated semiconductor lasers relied on the FM efficiency of the lasers, also known as chirp, to broaden the optical spectrum. Darcie, et al, "Fiber-Reflection-Induced Impairments in Lightwave AM-VSB CATV Systems," 9 J. Lightwave Tech. 991 (1991). Chirp is known in the art as the incidental modulation of the light's wavelength or frequency that occurs during direct intensity modulation of a light source. Chirp resulting from direct modulation by an amplitude modulated-vestigial sideband format (AM-VSB) CATV signal can broaden the optical spectral width, thereby reducing the noise caused by MPI.

Not all of the effects of chirp, however, are beneficial. Detrimental effects caused by the interaction of chirp and polarization-mode dispersion (PMD) or chromatic dispersion in the fiber increase as the frequency of the modulation increases. CATV signals are carried at frequencies up to 500 MHz or more. As a result, the use of chirp produced by CATV signals can cause an unacceptable level of signal degradation due to chirp-related impairments. See Phillips, et al, "Non-linear Distortion Generated by Dispersive Transmission of Chirped Intensity-Modulated Signals," 3 IEEE Photonic Tech. Letters 481-83 (1991). This forces the system designer to strike a delicate balance between too much chirp, where dispersion creates problems, and not enough, where multipath interference limits system performance.

An alternative proposal to broaden the optical spectrum is to employ a fast phase modulator in the optical transmission system. See Yariv, et al., "A Reduction of Interferometric Phase-to-Intensity Conversion Noise in Fiber Links by Large Index Phase Modulation of the Optical Beam," 10 J. Lightwave Tech. 978-981 (July 1992). Although this method can lower the noise due to MPI, this method has the disadvantage of requiring the incorporation of a fast phase modulator, which significantly increases the cost of the system.

SUMMARY OF THE INVENTION

The present invention provides a method of reducing interference noise by broadening the optical spectrum without unduly increasing dispersion impairments in an optical communications system. The method comprises modulating or "dithering" the optical signal frequency to broaden the optical spectrum. This is accomplished by applying a low frequency signal to the optical source in a manner that modulates the light source output frequency. By using a low modulation frequency, typically between 1 kHz and 100 kHz, and large optical frequency excursions, the optical spectrum can be broadened so that the MPI noise is reduced. While the method according to the present invention may also result in increased distortion, the distortion it produces is spectrally different than that of the prior art and results in less perceptible signal degradation.

The optical frequency can be modulated utilizing a number of different techniques, including, for example, using thermal tuning means on the laser or direct modulation of the laser. The invention may be implemented in several types of systems including those incorporating externally modulated solid state lasers and either externally modulated or directly modulated semiconductor lasers.

The present invention not only reduces the interference noise in a system, but reduces stimulated Brillouin scattering by broadening the optical spectrum.

DETAILED DESCRIPTION

The present invention provides a method for reducing noise in an optical transmission system, such as a CATV system, by applying a low frequency signal to the optical signal generator in a manner that modulates the optical output frequency. One embodiment of an optical signal generator 10 capable of performing the inventive method is illustrated in FIG. 1.

Figure 1:
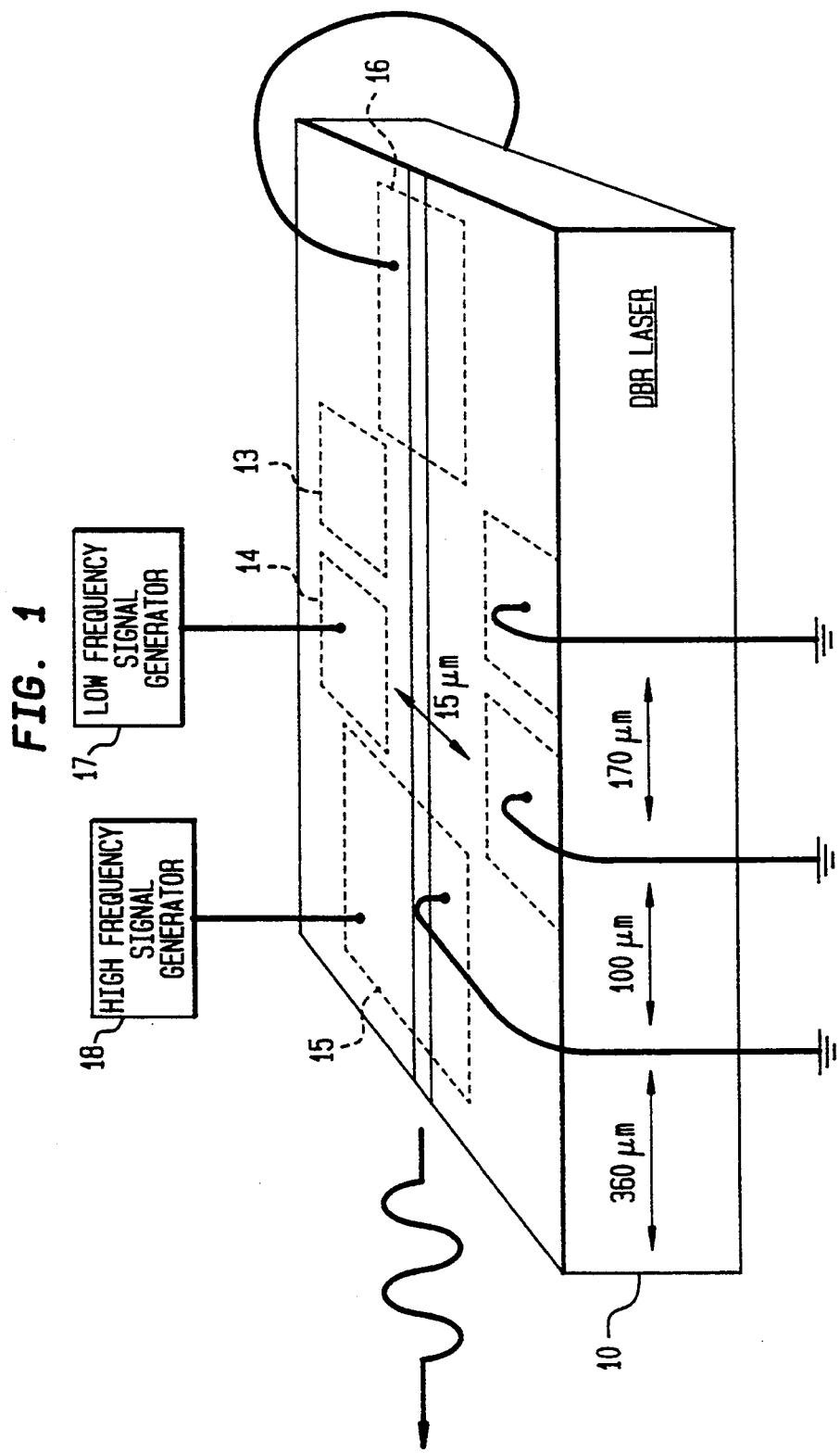
FIG. 1 shows a 1.5 μm distributed Bragg reflector laser that is tunable using resistive heating, which may be used in apparatus and methods according to the present invention.

FIG. 1 illustrates a 1.5 μm distributed Bragg reflector (DBR) laser 10 that may be frequency tuned by a thermal tuning means comprising a resistive heater. The DBR laser 10 is a semiconductor laser having various control sections including a Bragg section 13, a phase control section 14, and an active section 15. The Bragg section 13 and phase control section 14 further include a resistive heater or tuning resistor which may suitably be a top p-type cladding layer on the semiconductor laser 10. See Woodward, et al., "A DBR Laser Tunable by Resistive Heating," 4 IEEE Photonic Tech Letters 1330–32 (1992). The laser 10 also contains a back detector section 16. The general configuration of a DBR laser for use in an optical transmission system is well known in the art. For further details on such a laser, see Woodward, et al., supra.

A low frequency signal generator 17 capable of producing up to a 100 kHz sine wave output is connected to the phase control section 14 through ohmic contacts located thereon. Alternatively, the low frequency signal generator 17 may be connected directly to the active section 15, as discussed further below. Further, while a variable frequency generator is described herein, a fixed frequency source may be employed if single frequency operation is suited to the environment of operation. For example, a 1 kHz fixed frequency source may suitably be used in the embodiment described herein.

A high frequency signal generator 18 capable of producing one or more electrical signals in a first frequency range, for example, between 5–1000 MHz, but typically capable of producing CATV signals comprised of one or more carrier frequencies between 50–500 MHz, is operably connected to the active section 15 of the laser 10 to effect direct intensity modulation of the laser 10 with an electrical signal to be transmitted. In an actual transmission signal, generator 18 would be replaced by a CATV signal source. The back detector section 16 and Bragg section 13 are configured in a manner well-known in the art to enable the laser 10 to generate and transmit 1.3 μm or 1.5 μm lightwave signals.

In operation, generator 18 produces a first electrical signal to be transmitted, which may suitably be between 5–1000 MHz, but in a current CATV transmission application would comprise one or more electrically multiplexed 50–500 MHz carrier signals. The first electrical signal is intensity modulated onto the lightwave carrier by modulating the active section 15 of the laser 10 of FIG. 1. Alternatively, the laser 10 may be modulated externally as is well known in the art. The low frequency signal generator 17 produces a second electrical signal, herein referred to as the dither signal, which frequency modulates the DBR laser 10 in the manner described herein. The dither signal, which may suitably be a one volt, 1 kHz sinusoid or other periodic signal, is applied across the resistive heater in the phase control section 14 of the DBR laser 10. Because the phase control section 14 contains a resistive heater, the temperature of the phase control section 14 of DBR laser 10 will rise when a voltage is applied thereto. As the temperature changes, the frequency of the generated optical signal changes. Consequently, the application of a sinusoidal dither signal will cause both the temperature and the optical frequency of the laser to modulate.

For a DBR laser such as the DBR laser 10 of FIG. 1, a dither signal amplitude of one volt is generally sufficient to produce approximately a 2 GHz excursion in the optical carrier frequency. It will be understood that the dither signal amplitude and frequency are specified by way of example only. The dither signal frequency may vary for the particular application or embodiment as will be discussed further below, but should be within a range outside the frequency band of the electrical carrier signal bandwidth. Typically, the dither signal frequency will be below the carrier signal bandwidth. Likewise, the dither signal amplitude that is required to produce a specific excursion in optical carrier frequency may vary for the particular application, and is dependent on the tuning characteristics of the laser. The determination of such characteristics is a relatively simple matter for one skilled in the art. See, for example, Woodward, et al., supra.

Figure 2:
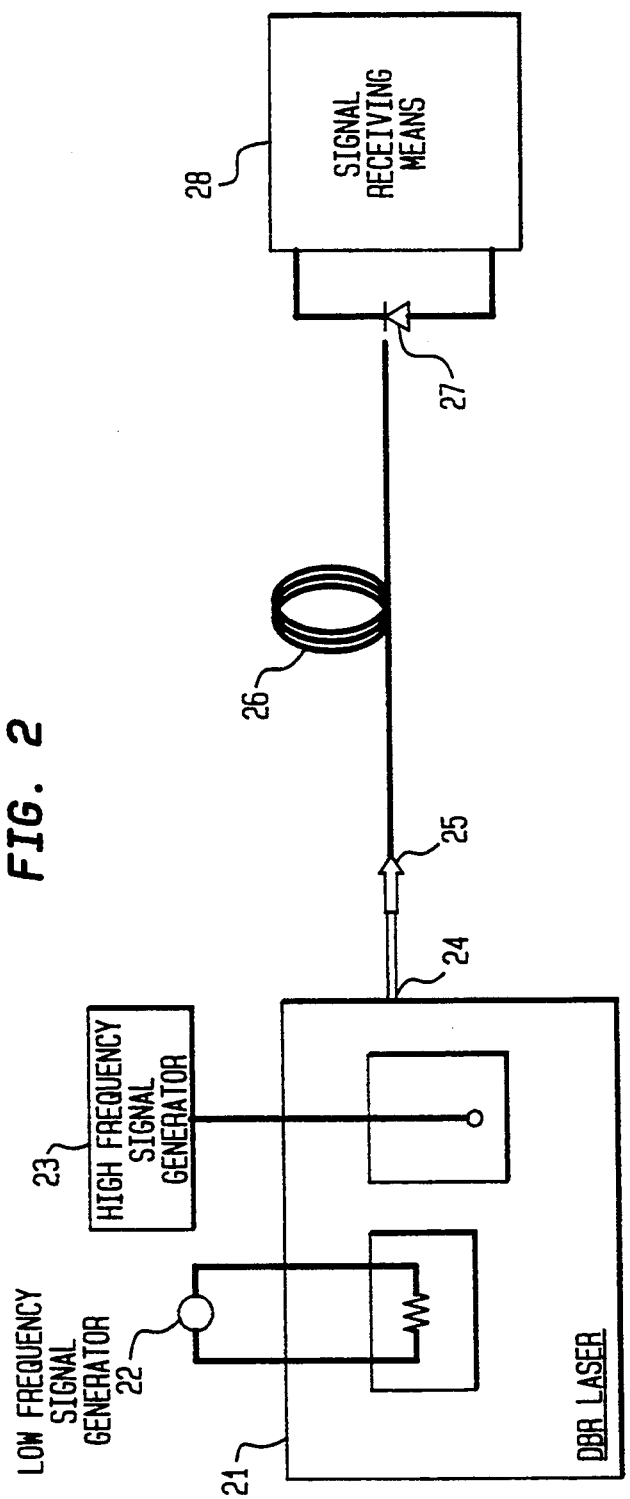
FIG. 2 shows an optical transmission system employing the method of broadening the optical spectrum according to the present invention.

FIG. 2 shows a lightwave transmission system in accordance with the present invention. A tunable laser 21 having a frequency tuning means, which may suitably be the thermally tunable DBR laser 10 as described in connection with FIG. 1, is operably connected to a low frequency signal generator 22 and a high frequency signal generator 23. In a commercial embodiment of the present invention, the laser 21 may alternatively be any laser incorporating a tuning means, such as a distributed feedback (DFB) laser or an yttrium-aluminum-garnet (YAG) laser. These embodiments are discussed further below. The tuning means may suitably be a resistive heater incorporated onto the laser 21 or an acousto-optic frequency modulator following the laser 21. The use of an acousto-optic frequency modulator for tuning a laser is well known in the art.

The high frequency signal generator 23 produces a first electrical signal, which may suitably be a CATV signal, to be transmitted which intensity or phase modulates the tunable laser 21. The low frequency generator 22 produces a second electrical signal that frequency modulates the tunable laser 21. The frequency of the second electrical signal is lower than the lowest frequency of the first electrical signal bandwidth. The tunable laser 21 produces at its optical output an intensity modulated and frequency modulated optical signal.

The optical output of the tunable laser 21 is operatively coupled to a lensed tip fiber 24 which may be on the order of 1 meter in length. The other end of the lensed tip fiber is connected to the input of an optical in-line isolator 25. The in-line isolator 25 operates to prevent the optical signal from reflecting back into the laser 21. Alternatively, the in-line isolator 25 and lensed tip fiber 24 may be replaced by an isolator which is directly connected to the laser 21 as is common in commercial laser packages. For example, an AT&T 257-type DFB laser package incorporates an isolator. Such a laser would of course require the addition of a resistive heater as discussed further below.

The output of the optical isolator 25 is connected to one end of a length of optical fiber 26 which may suitably be on the order of 20 km. In operation, the optical signal travels through the lensed tip fiber 24, the in-line isolator 25, and the length of optical fiber 26 to an optical signal detector 27 that is connected to the other end of the fiber 26. The optical signal detector 27 reproduces a signal similar to the first electrical signal produced by the high frequency generator 23. The optical signal detector is operably connected to signal receiving means 28. In one embodiment, the signal receiving means 28 may comprise a means for demultiplexing a CATV signal, a means for demodulating one or more of the demultiplexed 50–500 MHz carrier signals, and a means for viewing or recording the demodulated video signal. Alternatively, the signal receiving means 28 may be connected to further optical or electrical transmission means.

In an alternative embodiment of the invention, the laser 21 of FIG. 2 may suitably be a DFB laser. DFB lasers are semiconductor lasers commonly employed in commercial lightwave systems. A DFB laser may readily be adapted to include a tuning means, such as a thermal tuning resistor or an acousto-optic frequency modulator. For an example of a DFB laser incorporating a thermal tuning resistor, see Sakano, et al., "Tunable DFB Laser with a Striped Thin-Film Heater," 4 IEEE Photonic Tech. Letters 321–23 (1992). A dither signal as described above would then be applied across the tuning of the DFB laser in a similar manner as it is applied in the case of the DBR laser illustrated in FIG. 1. Intensity or phase modulation of a DFB laser by a high frequency signal, which may suitably be a CATV signal, is well known in the art.

The method of the present invention could enable the deployment of CATV systems operating at 1.55 microns which have heretofore been impracticable without compensation of dispersion induced distortion. At present, high-chirp DFB lasers have been operating in 1.55 micron systems, but require extensive dispersion distortion compensation. In the art, 1.55 $\mu$m distributed feedback (DFB) lasers with low chirp are currently being developed for analog systems so that systems can transmit signals at both 1.55 $\mu$m and 1.3 $\mu$m. See Cebulla, et al, "1.55-$\mu$m Strained Layer Multiple Quantum Well DFB Lasers with Low Chirp and Low Distortions for Optical Analog CATV Distribution Systems," Conf. Lasers and Electro-Optics (Baltimore, Md., May 5, 1993). The implementation of CATV systems using low-chirp 1.55 micron lasers, however, has been limited to date because such systems are presently incapable of maintaining a commercially acceptable CNR, due primarily to IIN. If a 1.55 $\mu$m low-chirp DFB laser is outfitted with a thermal tuning resistor and dithered according to the present invention, the IIN problem could be improved. As a result, low-chirp DFB 1.55 $\mu$m lasers may now feasibly be employed in AM-VSB CATV systems.

Furthermore, the development of interactive video will increase the need for interference noise reduction. Interactive video applications employ bidirectional transmission, which introduces a source of interference caused by single reflections. In particular, single reflections of one laser may interfere with direct transmissions of a laser transmitting the opposite direction on the same fiber. The method of the present invention may substantially enhance the development of such systems by reducing the added interference noise.

In another embodiment of the invention, the optical frequency in the DBR, DFB or other semiconductor laser may be dithered by modulating the laser's active section. In other words, the dither signal could be applied to the same section of the laser as that to which the high frequency electrical signal is applied. Due to the thermal characteristics of the laser semiconductive material, the FM efficiency exhibited by semiconductor lasers at low frequencies is much larger than the FM efficiency in the CATV band. It is therefore possible to broaden the optical spectrum of even a low-chirp laser by applying a low frequency signal to its active section. Dither frequencies of up to 100 kHz may suitably be used.

The advantage of this embodiment of the present invention is its applicability to existing DFB laser systems. DFB lasers in current commercial use generally do not contain the incorporated resistive heaters required for the method of temperature modulation described above in connection with FIG. 1. Because the direct application of the dither signal to the laser active section does not require a resistive heater, the existing systems may employ the method of the present invention without retrofitting or replacing the existing DFB lasers. Direct modulation of the active section with the low frequency dither, however, requires a larger intensity modulation depth than that required when modulating the temperature as discussed in connection with FIG. 1. It has been shown that a DBR laser dithered by modulating the resistive heater on the phase control section requires a modulation depth of m=0.1% to produce a frequency excursion of 0.6 GHz. To obtain the same frequency excursion by directly modulating the active section, a modulation depth of m=1% is required. Because significantly less modulation depth is required, frequency modulation through a thermal tuning means is preferable for implementation in new systems.

A further embodiment of this invention may be used in optical systems employing externally modulated lasers. Instead of modulating the high frequency signal, for example a CATV signal, onto the active section of the laser, the laser may be externally modulated. It is well-known in the art to externally modulate both semiconductor lasers, for example, a DFB or DBR, and solid state lasers, for example, a YAG. The application of the dither signal does not change for externally modulated systems. A YAG laser may then be dithered via a resistive heater as discussed above and the semiconductor lasers may be dithered through any of the above described methods.

For all of the above-described embodiments, it is important to apply a dither signal of appropriate amplitude and frequency. Accordingly, the theory and method for choosing the proper dither signal are discussed below. Initially, it is important to understand generally the MPI phenomenon that causes IIN.

MPI is caused by double reflections of a light signal, one backwards and one forwards, in optical fiber. Because of MPI, one portion of the light signal can travel directly through the optical fiber to a detector while another portion is twice reflected before it reaches the same detector. As a result, the arrival of the doubly-reflected portion at the detector is delayed with respect to the unreflected signal. IIN is the noise that results from the simultaneous arrival of direct input signals and doubly-reflected signals at the optical detector.

The coincidental arrival of a direct signal and a doubly-reflected signal results in the generation of noise concentrated at the difference in optical frequency, or beat frequency, between the two signals. The sum of the noise caused by the continuous generation of these beat signals tends to concentrate at frequencies within the CATV spectrum.

The dither signal, applied according to the present invention, varies the laser's optical frequency, which spreads the noise due to MPI over a broad spectrum. In other words, the dither signal serves to diffuse the concentration of the beat signals. Consider a system transmitting a 50-500 MHz carrier signal on optical fiber in which the input light interferes with a reflected light delayed by a time $\tau$. Theoretically, the objective is to vary the laser frequency by more than 500 MHz in the time period $\tau$. If this is accomplished, the two signals will differ in optical frequency by more than 500 MHz, and the beat signal that would have otherwise added to the noise concentration below 500 MHz will be moved to a higher frequency. Consequently, it is desirable to vary the laser frequency by a relatively large amount to distribute the noise to higher frequencies.

Ideally, the optical frequency should be varied by an amount sufficient to cause the beat frequency between the input light and the doubly-reflected light delayed by a time $\tau$ to occur outside the signal frequency band. For example, in a CATV system wherein the frequency band is 50-500 MHz, the optical frequency should constantly be changed by more than 500 MHz for every time period $\tau$. However, it is impossible to increase or decrease the optical frequency indefinitely. Accordingly, the present invention dithers the optical frequency using a bounded signal, for example, a sinusoid or other periodic signal.

The optical frequency, $f_{opt}$, under the influence of a sinusoidal dither signal, may be expressed: $f_{opt} = f_{opt,0} + df_{opt}\cos(\Omega t)$, where $df_{opt}$ is the magnitude of the optical frequency excursion and $\Omega$ is the dither signal frequency. Because the optical frequency changes by the quantity $df_{opt}\cos(\Omega t)$, the beat frequency between the incident beam and the doubly-reflected beam at a time $\tau$ later becomes:

$$df = (df_{opt}\sqrt{2 - 2\cos(\Omega\tau)})\cos(\Omega t).$$

For a small $\Omega\tau$, this equation may be simplified as the following approximation: $df = (df_{opt}\,\Omega\tau)\cos(\Omega t)$.

The beat frequency, as discussed above, should be as large as possible. The beat frequency maximum, however, is limited by system parameters including dispersion and degradation of laser output power. These limitations result from attempting to dither the laser too much in order to achieve higher beat frequencies. A balance must therefore be struck between too much dither and too little dither. It has been found that the maximum of the beat frequency, df, above, should be at least equal to or larger than the signal bandwidth. In the case of a 50-500 MHz broadband CATV signal, for example, the maximum df should ideally be greater than 500 MHz. Consequently, $(df_{opt}\,\Omega\tau) > 500$ MHz. In the case of a single carrier signal, for example, a 77.25 MHz carrier, the maximum df should be greater than the signal frequency. Consequently, in the case of a 77.25 MHz carrier, $(df_{opt}\,\Omega\tau) > 77.25$ MHz. The more the $df_{opt}\,\Omega\tau$ exceeds the frequency band of interest, the more effective the reduction of MPI will be. The determination of the maximum optical frequency excursion, $df_{opt}$, the dither frequency, $\Omega$, and the time delay, $\tau$, caused by a reflection in the fiber are discussed below.

As discussed above, $\tau$ is the time delay between an input signal and a doubly-reflected signal which arrive simultaneously at a detector due to MPI. If this interference is caused by two discrete reflections in the fiber separated by a length l, then $\tau = 2nl/c$ for a fiber of a refractive index n. In most analog lightwave systems, however, the dominant source of MPI is double-Rayleigh backscatter (DRB), not discrete reflections. See Judy, 15th European Conf. Optical Communications, supra. For DRB, there is a distribution of distances between reflections, but it is reasonable to approximate this distribution with an effective length: $l_{eff} = (\frac{1}{2}a)(1-e^{-2az})$ where a is the attenuation per unit length, measured in nepers/km, of the optical fiber and z is the length of the fiber. The effective length, $l_{eff}$, may be substituted for l in the equation for determining the time delay between input signal and reflected signals, $\tau = 2nl/c$.

As discussed above, $df_{opt}$ is the maximum optical frequency excursion as illustrated by the equation: $f_{opt} = f_{opt,0} + df_{opt}\cos(\Omega t)$. The dither signal amplitude dictates the value of $df_{opt}$. As described above in connection with FIG. 1, for a thermally tunable laser, the amplitude of the dither signal dictates the amount of change in temperature and consequently the change in optical frequency. The optical frequency excursion, $df_{opt}$, and the dither frequency should be chosen so that the product $(df_{opt}\,\Omega\tau)$ is larger than the maximum signal frequency. By way of example, a 5 GHz half-width-half-maximum frequency excursion may be accomplished by a dither signal amplitude of approximately two volts when applied to the phase control section of a DBR laser such as the one discussed above in reference to FIG. 1. The relationship between the dither amplitude and the change in optical frequency for other lasers may be readily determined by one skilled in the art.

Consider, for example, an optical system for transmitting a 77.25 MHz signal configured in a manner similar to that described above in connection with FIG. 2. For this example, the optical fiber 26 has a length of 16 km, an index of refraction of 1.5, and an attenuation per unit length of 0.35 dB/km. It is assumed that DRB is the predominant source of IIN. To modulate the light frequency in a manner adequate to cause the maximum of the beat frequency between the signal and the doubly-reflected light to be at least as large as the maximum signal frequency, a dither signal should be chosen so that $(df_{opt}\,\Omega\tau) > 77.25$ MHz.

The time delay $\tau$ between input signal and the delayed reflection should first be determined. For $\tau = 2nl/c$ in this case, $l = l_{eff}$, because DRB, and not discrete reflections, are the source of noise. As discussed above, $l_{eff} = (\frac{1}{2}a)(1-e^{-az})$. Where a, the attenuation of the fiber per unit length, is 0.35 dB/km, which translates to 0.08 nepers/km, and the overall length of the fiber, z, is 16 km, $l_{eff} = 6$ km. If the index of refraction, n, for the fiber is approximately 1.5, then, the $\tau \approx 0.06$ ms.

Given $\tau \approx 0.06$ ms, the amplitude and frequency to the dither signal may be determined. As indicated earlier in reference to FIG. 1, a dither signal amplitude of one volt produces an optical frequency excursion, $df_{opt}$, of 2.4 GHz. As discussed above in reference to FIG. 1, the relationship between dither signal amplitude and optical frequency excursion may readily be determined by one skilled in the art. If $df_{opt}=2.4$ GHz and $\tau \approx 0.06$ ms, then $(df_{opt}\Omega\tau)>77.25$ MHz requires that the dither signal frequency, $\Omega > 550$ Hz. As a consequence, a one volt, 1 kHz sine wave dither signal applied to the optical signal generator should substantially reduce the noise concentration level below 77.25 MHz caused by DRB having an effective distance between reflections of 6 km.

Figure 3:
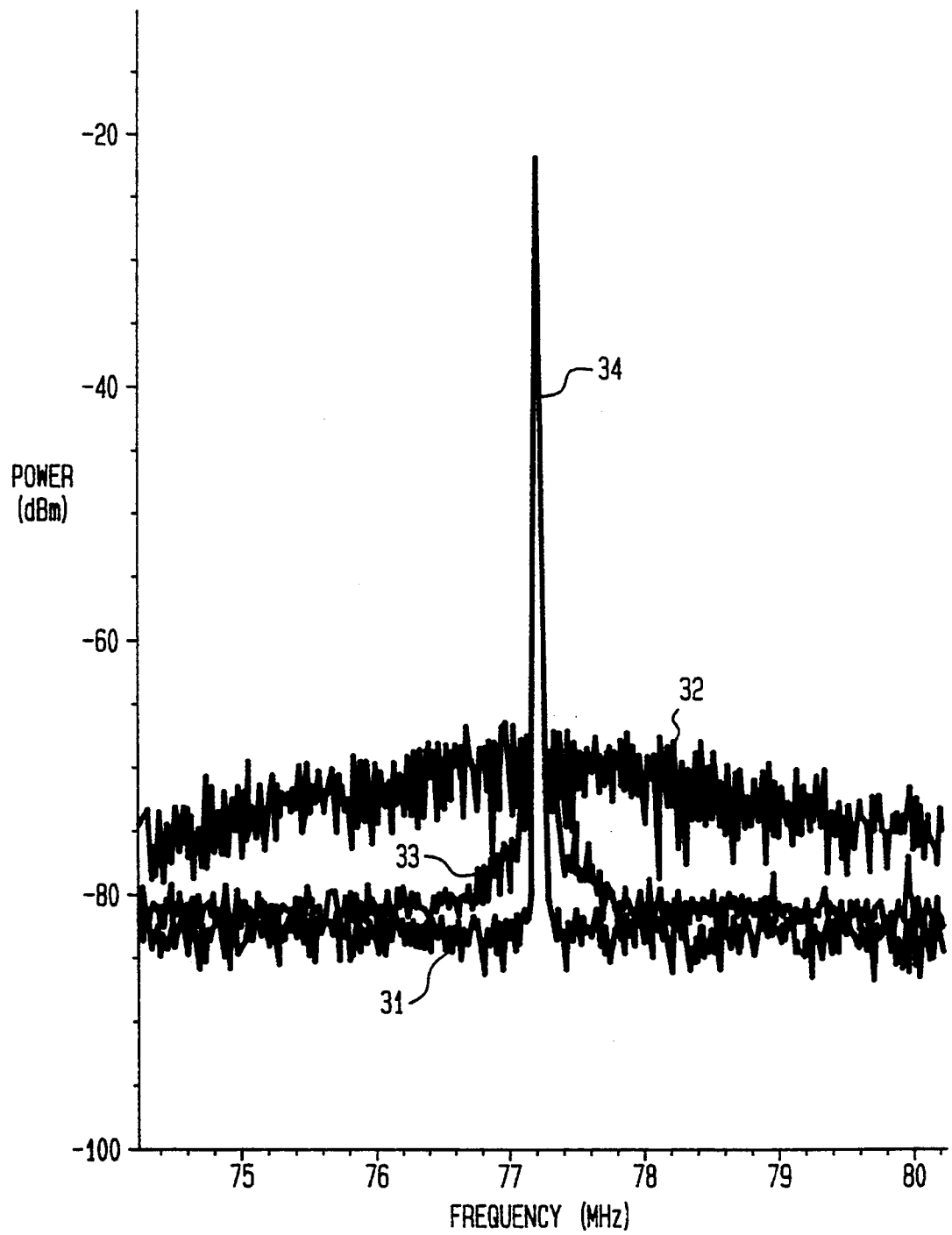
FIG. 3 is a graph of the frequency response of the optical signal under three different conditions demonstrating the advantages of the present invention.

To illustrate the advantages of the present invention, experimental data was obtained using the embodiment illustrated in FIGS. 1 and 2. FIG. 3 shows the optical spectra produced by a DBR laser modulated by a 77.25 MHz signal under three separate conditions which are depicted by three curves 31, 32 and 33. The data presented in FIG. 3 was obtained in an experimental transmission system environment of the kind described above in reference to FIG. 2 wherein the laser 21 was a DBR laser such as the laser 10 of FIG. 1, the lensed tip fiber 24 was 3 meters in length and the length of optical fiber 26 was 16 km. The bottom curve 31 of FIG. 3, which has the lowest noise floor, was taken without the 16 km length of fiber 26 of FIG. 2 present in the system. Under these ideal conditions, the CNR is primarily limited by shot-noise from the laser 21 of FIG. 2. The uppermost curve 32 of FIG. 3 was taken under the conditions as illustrated in FIG. 2, but without application of a dither signal. The comparison of curves 31 and 32 reveals that the addition of the fiber added over 9 dB of noise, a substantial portion of which is due to IIN. In the middle spectrum 33, a 1 kHz sine wave dither signal had been applied to the phase-control section of the laser 21 of FIG. 2 according to the method of the present invention.

The desired portion of the spectrum, the carrier signal at 77.25 MHz, is illustrated by portion 34 of the curve 32, and peaks at approximated $-20$ dBm under the test conditions. Although the resolution in FIG. 3 only shows one curve having a portion 34, similar portions of curves 31 and 33 are superimposed thereon and have substantially the same characteristics. The portions of curves 31, 32 and 33 which are at frequencies other than approximately 77.25 MHz represent the power level of undesirable noise, also called the noise floor. By comparing curve 32 and 33, it is clear that the dither signal significantly reduced the noise floor.

The noise floor of curve 32 ranges from about $-77$ dBm at 74 MHz to nearly $-70$ dBm as the frequency approaches the lower limit of the carrier band near 77.25 MHz. The noise power level remains at $-70$ dBm at frequencies just above the higher limit of the carrier band and decreases to $-77$ dBm at approximately 80 MHz. The noise floor on curve 33, however, where the dither frequency was applied, remained substantially constant at or below $-80$ dBm for the range between 74 MHz and 80 MHz, not including the carrier frequency. It can be seen, therefore, that the application of the dither signal lowered the noise floor by between 3 dB and 10 dB at frequencies near the carrier frequency.

It should be noted that under the test conditions discussed above, an increase in noise was observed for a small frequency band of approximately 0.3 MHz on either side of the carrier band. It was subsequently determined that this noise was due to discrete reflections at the coupling between the laser 21 and the lensed tip fiber 24 and the coupling between the in-line isolator 25 and the lensed tip fiber 24. As discussed above in connection with FIG. 2, commercial laser packages usually consist of a laser connected directly to an optical isolator, thus eliminating this particular source of noise. Later experimentation with a DFB laser package containing an integral optical isolator confirmed this fact.

Returning to FIG. 3, the reduction in the noise floor and the resulting improvement in the CNR as illustrated in FIG. 3 represent a significant improvement to present analog lightwave systems. As discussed above, analog optical transmission systems such as those employed to transmit CATV signals have stringent CNR requirements. For CATV systems, improvements in the CNR can result in the delivery of signals with enhanced picture quality to both receivers of the optical signal and, ultimately, cable television subscribers. Presently, the highest achievable CNR of existing 1.3 micron systems is limited, in part, by IIN due double-Rayleigh backscatter (DRB). The techniques discussed above, by providing even a 2-3 dB improvement in the CNR, can now substantially enhance the quality and performance of existing 1.3 micron CATV systems.

It should be noted that the slow dither of the optical frequency will cause distortion when combined with fiber dispersion. This distortion, however, is spectrally different than the distortion caused by the prior art method of using high chirp lasers to broaden the optical spectrum. The distortion due to the dither signal appears close to the carrier frequencies as it is due to the cross product of the carrier signal and the low frequency dither signal, while the distortion due to chirp appears over a wider spectrum. It was observed experimentally that in CATV applications relatively high amounts of distortion can be tolerated without degrading the video when employing the technique of the invention. Experimental observations show that no discernable signal degradation occurred until the distortion level reaches 30 dB below the carrier signal. Because similar distortion due to chirp can be no larger than 60 dB below the carrier signal before unacceptable signal degradation occurs, the invention, by using a low frequency dither to modulate the optical frequency, provides a substantial advantage.

A further advantage of the present invention is its ability to reduce stimulated Brillouin scattering. Stimulated Brillouin scattering (SBS) is an impairment to lightwave systems using high power transmission. Consequently, the CNR of high power CATV systems suffer from SBS. It is also known that by broadening the optical spectrum of the laser, SBS may be reduced. See, for example, Mao et al., "Suppression of Brillouin Scattering In Lightwave AM-VSB CATV Transmission Systems", Optical Fiber Conference/IOOC, 141–43 (1993). The method and apparatus of the present invention, by broadening the optical spectrum, is operable to reduce SBS in high power lightwave systems.

It is to be understood that the above-described arrangements of the invention are merely illustrative. Other arrangements may be devised by those skilled in the art which will embody the principles of the invention and fall within the spirit and scope thereof.

We claim:

1. A method of reducing a noise level in an electrical signal which is modulated on an optical carrier signal in an optical transmission system, said method comprising:
   effecting modulation of an optical carrier signal generated by an optical signal generator with a first electrical signal within a first frequency range;
   effecting frequency modulation of the optical carrier signal by applying a second electrical signal to the optical signal generator, said second electrical signal being within a second frequency range wherein the second frequency range does not overlap with the first frequency range;
   transmitting said modulated optical carrier signal over an optical signal transmission line; and
   effecting detection of the optical carrier signal to produce an electrical signal having a noise level reduced by said frequency modulation.

2. The method of claim 1 wherein the noise level is due in part to reflections in the optical transmission line.

3. The method of claim 1 wherein the noise level is due in part to multipath interference in the optical transmission line.

4. The method of claim 1 wherein the frequency modulation is operable to reduce stimulated Brillouin scattering in the optical transmission system.

5. The method of claim 1 wherein the highest frequency of the second frequency range is lower than the lowest frequency of the first frequency range.

6. The method of claim 1 wherein the first electrical signal comprises one or more electrically multiplexed carrier signals and the first frequency range is between 5 MHz and 1000 MHz.

7. The method of claim 1 wherein the first electrical signal comprises one or more electrically multiplexed carrier signals and the first frequency range is between 50 MHz and 500 MHz.

8. The method of claim 1 wherein the highest frequency of the second frequency range is equal to or less than 100 kHz.

9. The method of claim 1 wherein the optical signal generator comprises a laser having a tuning means, and the frequency modulation is effected by applying the second electrical signal to the tuning means.

10. The method of claim 1 wherein the optical signal generator comprises a semiconductor laser having an active section, and the frequency modulation is effected by applying the second electrical signal to the active section of the laser.

11. A system for transmitting electrical signals using a lightwave carrier signal comprising:
   a) light signal generating means, the light signal generating means comprising a laser, means for modulating the laser with a first electrical signal, and means for frequency modulating of the laser;
   b) a first electrical signal generating means for generating a first electrical signal to be transmitted, operably connected to the modulation means of the light signal generating means;
   c) a second electrical signal generating means for generating a second electrical signal for frequency modulating the laser, said second electrical signal being of a lower frequency than the first electrical signal, operably connected to the frequency modulating means of the light signal generating means; and
   d) means for directing and carrying the lightwave signal operably connected to the light signal generating means to direct and carry the signal produced by said light signal generating means.

12. The system of claim 11 wherein the means for frequency modulating the laser comprises a frequency tuning means.

13. The system of claim 12 wherein the laser having a frequency tuning means comprises a semiconductor laser.

14. The system of claim 12 wherein the laser having a frequency tuning means comprises a solid state laser.

15. The system of claim 12 wherein the frequency tuning means comprises an acousto-optic frequency modulator.

16. The system of claim 12 wherein the frequency tuning means comprises thermal tuning means.

17. The system of claim 11 wherein the laser comprises a semiconductor laser having an active section, and the frequency modulating means comprises the active section.

18. The system of claim 11 wherein the first electrical signal generating means comprises a community antenna television signal generating means.

19. The system of claim 11 wherein the first electrical signal generating means generates a plurality of electrically multiplexed 5 MHz to 1000 MHz carrier signals.

20. The system of claim 11 wherein the first electrical signal generating means generates a plurality of electrically multiplexed 50 MHz to 500 MHz carrier signals.

21. The system of claim 11 wherein the first electrical signal generating means generates one or more 5 MHz to 1000 MHz signals.

22. The system of claim 11 wherein the first electrical signal generating means generates one or more 50 MHz to 500 MHz signals.

23. A system for transmitting community antenna television signals using a lightwave carrier signal comprising:
   a) light signal generating means operable to produce light signals have a wavelength of between 1.3 $\mu$m and 1.55 $\mu$m, the light signal generating means comprising a laser, means for intensity modulating the laser, and means for dithering the laser;
   b) a source of community antenna television signals operably connected to the laser intensity modulating means of the light signal generating means to intensity modulate the laser with a community antenna television signal;
   c) an electrical signal generator capable of producing a dither signal and connected to the laser dither means of the light signal generating means; and
   d) means for directing and carrying the lightwave signal operably connected to the light signal generating means to direct and carry the signal produced by said light signal generating means.

* * * * *